United States Patent
Shahaf et al.

(10) Patent No.: US 8,526,947 B1
(45) Date of Patent: Sep. 3, 2013

(54) METHOD AND APPARATUS FOR ENABLING EFFICIENT BATTERY USE ON A DUAL MODE COMMUNICATION DEVICE

(71) Applicant: Motorola Solutions, Inc., Schaumburg, IL (US)

(72) Inventors: Mark Shahaf, Vernon Hills, IL (US); Thomas J. Senese, Schaumburg, IL (US)

(73) Assignee: Motorola Solutions, Inc., Schaumurg, IL (US)

( * ) Notice: Subject to any disclaimer, the term of this patent is extended or adjusted under 35 U.S.C. 154(b) by 0 days.

(21) Appl. No.: 13/629,427

(22) Filed: Sep. 27, 2012

(51) Int. Cl.
*H04W 88/02* (2009.01)

(52) U.S. Cl.
USPC .................................................. 455/435.1

(58) Field of Classification Search
USPC .................................................. 455/435.1
See application file for complete search history.

(56) References Cited

U.S. PATENT DOCUMENTS

2011/0237287 A1    9/2011   Klein et al.

*Primary Examiner* — Diane Mizrahi
(74) *Attorney, Agent, or Firm* — Daniel R. Bestor

(57) ABSTRACT

Upon connecting to the broadband and narrowband networks, a communication device registers with a broadband wireless network via a broadband interface and with a narrowband wireless network via a narrowband interface. One of (i) a first change in status indication is provided from the broadband interface to the narrowband interface reflecting a change in status between the broadband interface and the broadband network, and (ii) a second change in status indication is provided from the narrowband interface to the broadband interface reflecting a change in status between the narrowband interface and the narrowband network. The communication device transmits one of (i) the first change in status indication and a narrowband status indication to a network component via the narrowband interface, and (ii) the second change in status indication and a broadband status indication to the network component via the broadband interface.

21 Claims, 4 Drawing Sheets

METHOD AND APPARATUS FOR ENABLING EFFICIENT BATTERY USE ON A DUAL MODE COMMUNICATION DEVICE

FIELD OF THE DISCLOSURE

The present disclosure relates generally to providing presence information for a dual mode communication device operating in both a broadband network and a narrowband network, and more particularly, to maintaining accurate connectivity status for the communication device while enabling efficient battery use at the communication device.

BACKGROUND

Institutional organizations, such as public safety organizations, typically use specialized voice communication systems embodied as narrowband radio systems. These narrowband systems typically support low-bit-rate digital or analog transmission of audio and/or data streams. An example of such a voice communication system is a Project 25 (P25)-compatible two-way Push-To-Talk voice communication system that includes wireless and wired voice communication devices. The voice communication devices may be, for example, portable narrowband two-way radios, mobile radios, dispatch consoles, or other similar voice communication entities that communicate with one another via wired and/or wireless networks. Institutional organizations choose these types of voice communications systems because they provide improved end-to-end voice quality and efficient group communication, use advanced cryptography, enable centralized logging of calls, and/or are associated with lower delay and higher reliability.

In parallel, institutional users may also use broadband communication systems to access public safety data applications. An example of such a broadband system is a wireless data network that operates in accordance with the Long Term Evolution (LTE) signaling standard and that includes wireless and wired communication devices. Broadband systems typically support high-bit-rate digital transmission of data streams, including real-time video. Bandwidth requirements of a broadband system are generally much greater than that required for a narrowband system and the radio frequency (RF) range of a broadband system is generally smaller than that of a narrowband system. Narrowband coverage is already widely deployed for mission critical use and is typically guaranteed for large percentages of given geographical areas, such as cities, counties and/or states. Although broadband systems are being rapidly deployed, there are likely to be gaps in broadband coverage in some areas that are already covered by narrowband systems.

In order to communicate on both a broadband system and a narrowband system, a communication device typically incorporates separate interfaces for each system. The communication device is configured to operate each interface on independent wireless links. For example, the communication device may operate on a Common Air Interface for a P25 system and a $U_u$ interface for an LTE system. Information obtained from both interfaces is aggregated and processed by applications (also referred to as application clients or simply as clients) residing within the communication device. This enables a subscriber to maintain voice communications using, for example, an existing narrowband P25 system, while being able to access data applications using a broadband connection. Due to expected gaps in broadband coverage in some areas and in order to leverage the mature coverage and relatively advanced deployment of narrowband systems, in a current implementation, some low-bit-rate digital or analog data applications may be kept on narrowband systems, while new services that demand large throughput (e.g. radio software re-programming) are set up to operate on the broadband systems.

The communication device could be either one device with two network interfaces or it could be two separate devices with local connectivity between them. If two separate devices are used, each device will provide wide area connection to either the narrowband system or the broadband system. The local connectivity (which could be wirelesses or wired) between the separate devices would provide application clients on the communication devices with access to both wide-area communications links.

Whether operating via a broadband and/or narrowband interface, application client(s) residing within the communication device, in general, need to communicate with application server(s) located on a network. In order to provide the connectivity and ability for applications on the network to connect with clients on the communication device, the applications on the network need to have real-time knowledge of when there is a connection to the communication device. The applications on the network must also know what type of connection is viable at a given time. Both the broadband and narrowband networks are assumed to have an aggregated point, for example, a unified network service-layer routing, that provides a unified view and functionality to all applications in the network. In particular, a presence entity in the network service-layer routing provides the status of each communication device connected to the service-layer routing and the interface(s) for connecting with each communication device at a given time. This availability information allows applications on the network to determine, for example, what type of services to provide and the format of information to be sent to each connected communication device. As both the broadband and narrowband systems have their own coverage areas, the connection status of one or both interfaces may change as the communication device moves throughout a geographical area.

A current implementation requires constant exchanges of "heart-beat" messages between each communication device interface and the presence server to keep the presence server informed of the communication device connectivity status on the broadband and narrowband systems. This messaging exchange takes place on each respective interface and is typically more frequent over the broadband connection as the communication device is more likely to move in and out of broadband network coverage areas. The messaging exchange has a significant negative impact on the battery life in the communication device. Operating multiple interfaces on the communication device, in addition to potentially having the communication device connected via local wireless personal connection, requires that the communication device have a large battery. This increases the cost associated with the communication device and is likely to negatively impact the use time on a single battery charge. The "heart-beat" messages required for each operating subscriber also results in high traffic load on the network and reduces available network capacity.

Accordingly, there is a need for an improved method and apparatus for maintaining accurate connectivity status for a dual mode communication device while enabling efficient battery use on the communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
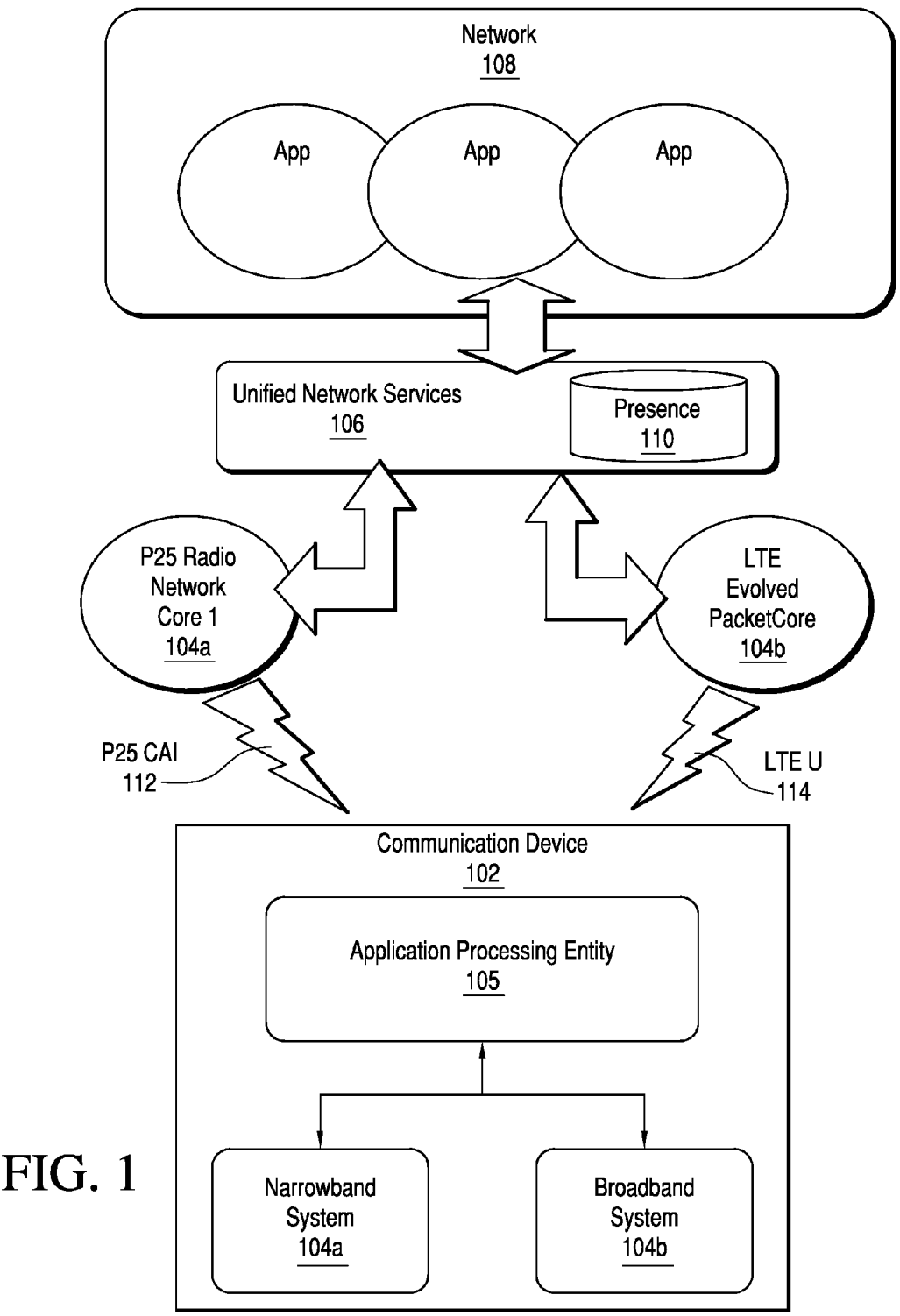
FIG. 1 is a block diagram of a communication system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for connecting a dual mode communication device to a broadband network and a narrowband network. The communication device initially registers with a broadband wireless network via a broadband interface on the communication device and with a narrowband wireless network via a narrowband interface on the communication device. One of (i) a first change in status indication is provided from the broadband interface to the narrowband interface reflecting a change in status between the broadband interface and the broadband network, and (ii) a second change in status indication is provided from the narrowband interface to the broadband interface reflecting a change in status between the narrowband interface and the narrowband network. The communication device subsequently transmits one of (i) the first change in status indication and a narrowband status indication to a network component via the narrowband interface, and (ii) the second change in status indication and a broadband status indication to the network component via the broadband interface.

FIG. 1 is a block diagram of a communication system used in accordance with some embodiments. Communication system 100 includes a communication device 102, a unified network services component 106 and a network 108 that includes one or more server applications. It should be noted that although only one communication device 102 is shown, system 100 may include multiple communication devices, and although system 100 illustrates a P25 narrowband network and an LTE broadband network, other types of narrowband and/or broadband networks could be additionally or alternatively used. Communication device 102 is capable of providing both voice and data services and is configured to communicate on both a narrowband system 104a and a broadband system 104b. Narrowband systems 104a, such as Project 25 (P25) compatible voice systems, typically support low-bit-rate digital or analog transmission of audio and/or data streams. Broadband systems 104b, for example, a wireless data network that operates in accordance with the Long Term Evolution (LTE) signaling standard, typically support high-bit-rate digital transmission of data streams, including real-time video.

Figure 2:
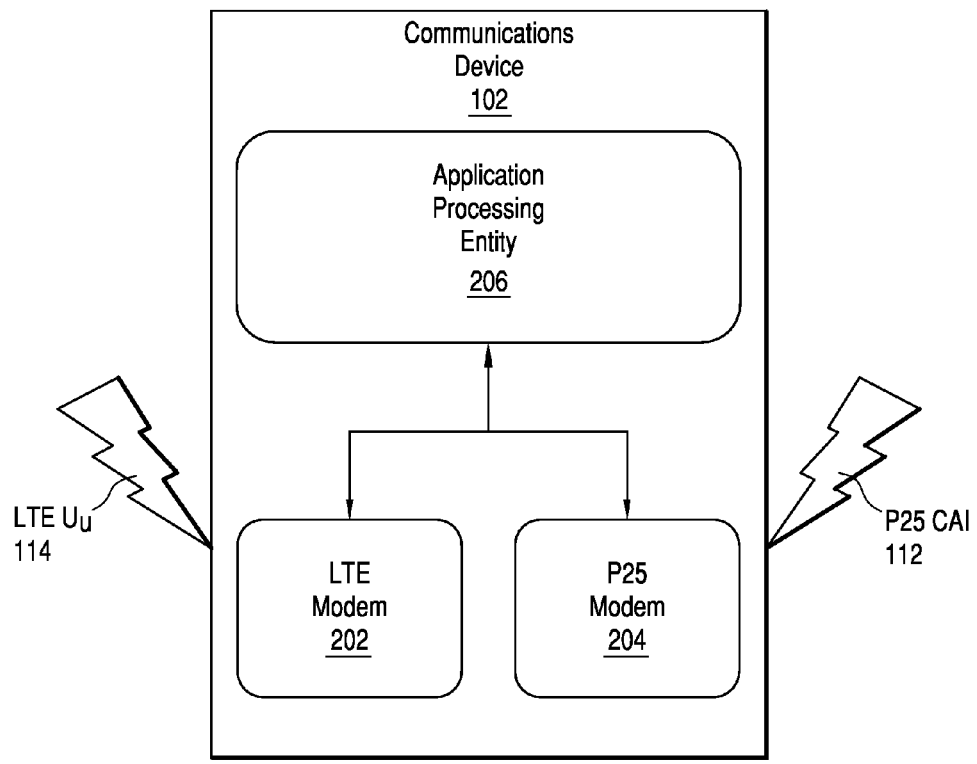
FIG. 2 is a block diagram of a communication device used in accordance with some embodiments.

FIG. 2 is a block diagram of a communication device used in accordance with some embodiments. Communication device 102 is configured to incorporate and enable a separate interface 202 and 204 for each of the narrowband and broadband systems, wherein the interface 202 or 204 for each system operates on an independent wireless link 112 or 114 for that system. For example, communication device 102 may operate the narrowband link 112 on a Common Air Interface for a P25 system and may operate the broadband link 114 on $U_u$ interface for a LTE system. In some embodiments, communication device 102 could be either one device with multiple network interfaces 202 and 204 or it could be two separate devices, each with its own network interface for connecting to either narrowband system 104a or broadband system 104b. If the communication device 102 includes two separate devices, then there will be local connectivity (not shown) between the separate devices. An application processing entity 206 (also shown as application processing entity 105 in FIG. 1) includes client applications that are configured to communicate with associated application server(s) located inside the network 108 when communication device 102 is connected to narrowband system 104a and/or broadband system 104b.

In some embodiments, when in a narrowband coverage area, communication device 102 initially registers with unified network services component 106 via P25 interface 112. This registration is considered a reliable indication that communication device 102 is connected to narrowband system 104a until communication device 102 updates its status with a de-registration request. The communication device 102 may be periodical pinged/queried for presence verification to address an exceptional case, such as when the battery is pulled out of communication device 102 during its operation.

Upon initially entering a broadband coverage area, communication device 102 similarly initially registers with unified network services component 106 via the LTE $U_u$ interface 114. Thereafter, in some embodiments, communication device 102 uses its P25 wireless connection 112 to keep the status of both interfaces 202 and 204 on communication device 102 up-to-date with a presence entity 110 in unified network services component 106. In alternate embodiments, communication device 102 uses its LTE $U_u$ interface 114 to keep the status of both interfaces 202 and 204 on communication device 102 up-to-date with presence entity 110 in unified network services component 106. Presence entity 110 provides a connection status of each communication device to applications in network 108. Presence entity 110 may also provide information to applications in network 108 about the interface(s) that each communication device is reachable on at a given time. The P25 connection 112 may be configured to be constantly operational as it provides access to mission critical services. In some implementations, the P25 connection 112 is optimized for sending and receiving short messages from multiple devices. This makes the P25 data connection 112, in some embodiments, a preferred communications option for sending updates on whether communication device 102 is available on one or more of its narrowband and broadband interfaces. Conventionally, presence entity 110 would deduce that connection to communication device 102 is broken or that communication device 102 is out of coverage range when communication device 102 ceases to generate and send a constant heartbeat message to presence entity 110. Optionally, presence entity 110 would generate and send presence requests to each communication device periodically and the lack of acknowledgement to the presence request would indicate to the presence entity 110 that the communication device 102 is out-of coverage range.

In embodiments where the P25 wireless connection 112 is used to keep the status of both interfaces 202 and 204 on communication device 102 up-to-date with presence entity 110, after the initial registration with the broadband network 104b, the broadband network interface 202 on the communication device 102 sends a message through the P25 connection interface 204 on the communication device 102 when the broadband network interface detects a change in its connectivity status to broadband network 104b. For example, broadband network interface 202 sends a message to P25 connection interface 204 when the broadband network interface 202 detects that communication device 102 is out of a broadband network coverage area or when it detects that communication device 102 has returned to a broadband network coverage area. In some cases, if communication device 102 is out of a broadband network coverage area for a predefined period of time, it will be required to re-register with the network.

Similarly, in embodiments where the LTE $U_u$ interface 114 is used to keep the status of both interfaces 202 and 204 on communication device 102 up-to-date with presence entity 110, after the initial registration with the narrowband network 104a, the narrowband network interface 204 on the communication device 102 sends a message to presence entity 110 through the broadband interface 202 when the narrowband network interface 204 detects a change in its connectivity status to narrowband network 104a. These embodiments significantly simplify the operation of communication device 102, reduces unnecessary load on the system resources, and more intelligently leverages the value of the more reliable or mature available network.

In embodiments where the P25 wireless connection 112 is used to send a connectivity indication for both interfaces 202 and 204 to presence entity 110, broadband interface 202 (or the entire broadband device itself) could be switched off or put into a sleep mode until broadband service is required or until presence information needs to be updated. In these embodiments, the only action broadband interface 202 would perform during idle times is to wake up periodically and measure available signal(s) to validate that communication device 102 is within its prior broadband network coverage area. Upon determining that communication device 102 is within the prior broadband network coverage area, broadband interface 202 would not take any other action and will resume its sleep mode. Only when broadband interface 202 fails to detect that it is within the prior broadband network coverage area will it indicate to the presence entity 110, via P25 interface 204, its new status. The broadband interface 202 will thereafter start an active broadband network search.

Conversely, in embodiments where the LTE $U_u$ interface 114 is used to send a connectivity indication for both interfaces 202 and 204 to presence entity 110, narrowband interface 204 (or the entire narrowband device itself) could be switched off or put into a sleep mode until narrowband service is required, or until presence information needs to be updated. During idle periods, narrowband interface 204 would periodically wake up to measure available signal(s) and validate that communication device 102 is within its prior narrowband network coverage area. If narrowband interface 204 fails to detect that communication device 102 is within the prior narrowband network coverage area, narrowband interface 204 sends its new status to the presence entity 110, via LTE $U_u$ interface 114. The narrowband interface 204 will thereafter start an active narrowband network search.

Figure 3:
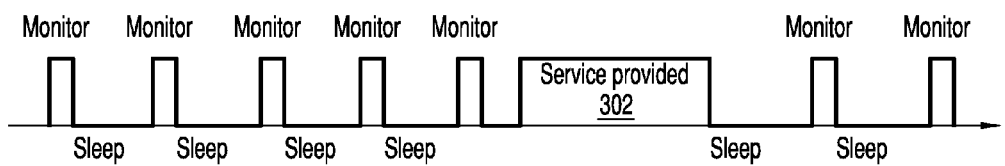
FIG. 3 is a block diagram of the operation of the broadband network interface in accordance with some embodiments.

FIG. 3 is a block diagram of the operation of the broadband network interface in accordance with some embodiments. Referring to FIG. 3, the broadband interface will wake up periodically to monitor available network signal(s). The monitor timing could be, for example, in line with a native energy economy scheme for modern cellular networks (including LTE) or for a longer or shorter period. When broadband service is required, the broadband interface will be taken out of its sleep mode to provide a broadband bearer, as shown by block 302. Upon completion of the service, the broadband interface will resume its sleep mode again to conserve battery life.

Figure 4:
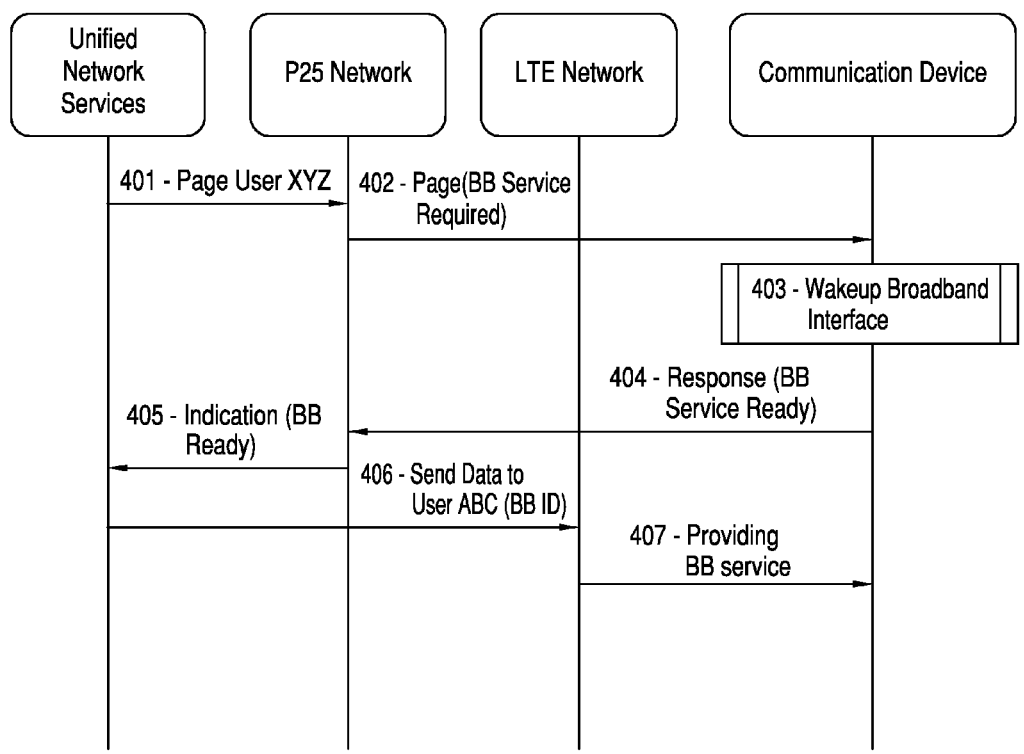
FIG. 4 is a flow diagram of an exemplary protocol to request broadband service over a P25 link in accordance with some embodiments.

FIG. 4 is a flow diagram of an exemplary protocol to request broadband service over a P25 link in accordance with some embodiments. When broadband service is requested or required, at 401, a unified network service sends a page to user XYZ via the P25 network. At 402, the P25 network forwards the page for the broadband service request to the communication device. At 403, the communication device wakes up the broadband interface. At 404, the communication device responds when the broadband interface on a communication device is active. At 405, the P25 network forwards the response to the unified network service. At 406, the unified network service sends data to the broadband network. At 407, the broadband network provides service to the communication device.

As would be apparent to one skilled in the art, similar to FIG. 4, in embodiments where the broadband interface is used to send a connectivity indication for both narrowband and broadband interfaces to the unified network service, the unified network service would send a page to the communication device through the broadband network and the broadband network would forward the page to the communication device and forward the response to the page to the unified network service. Upon receiving the response to the page, the unified network service would send data to the narrowband network for the narrowband network to provide service to the communication device.

Embodiments therefore provide a mechanism for the communications device to receive service that is specific to a specific network interface through parallel transactions across another network interface. For example, in some embodiments, the communication device indicates its loss of broadband coverage in a timely manner across a narrowband interface. Using, for example, a narrowband Enhanced Data Service will allow the communication device to transmit, without contention, an indication that its broadband coverage has been interrupted. The indication will most likely reach the network in a timely manner (e.g., within minutes). Otherwise, the network will have to wait for the communication device's broadband status to time out, which can be on the order of hours, or wait for an indication of detachment of the communication device's LTE bearer, which can be on the order of 30-60 minutes. The timely update of the device's loss of broadband connection will allow the network to more efficiently deliver packet data services to devices.

Embodiments also allow the network to notify, for example, the communication device through the P25 interface of a pending broadband service that is directed to that device. This operation allows the communication device to put its broadband interface into a sleep mode in order to conserve battery power consumption until it is needed.

Figure 5:
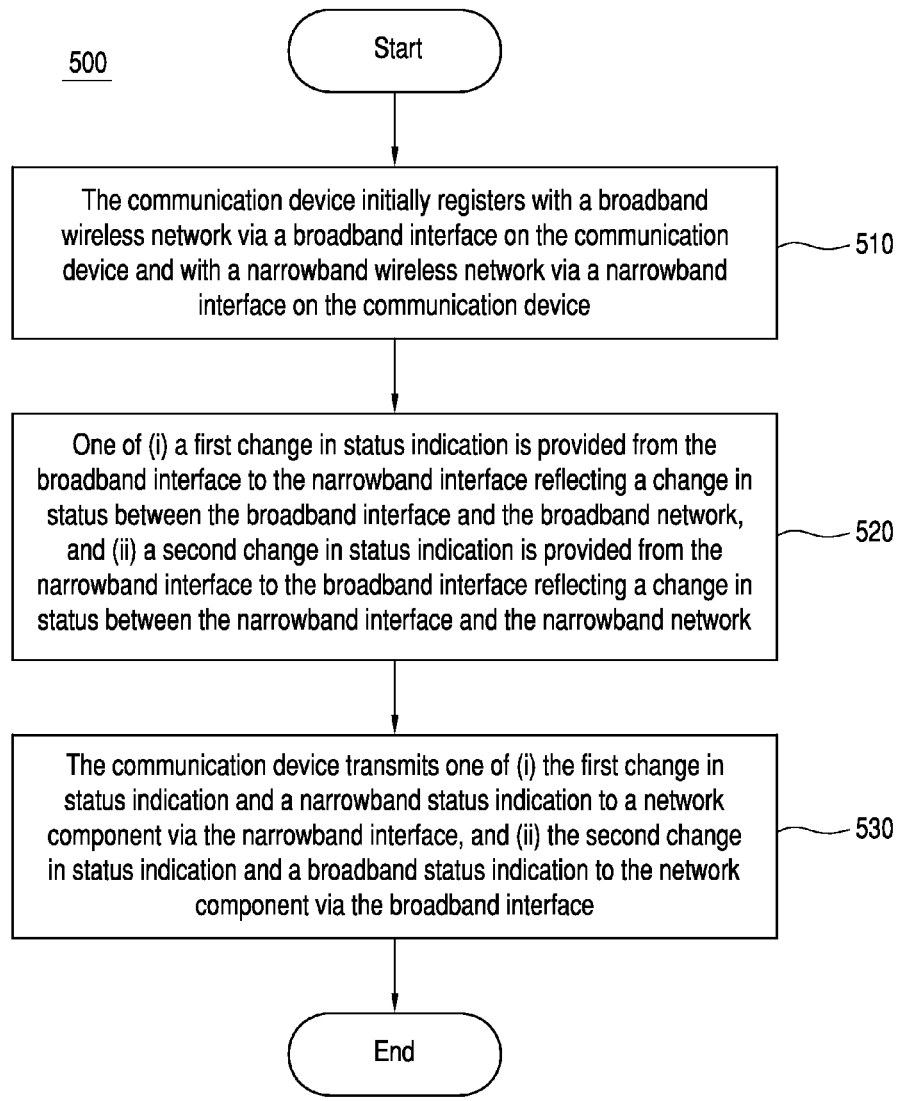
FIG. 5 is a flow diagram of the method used in accordance with some embodiments.

FIG. 5 is a flow diagram 500 of a method used in accordance with some embodiments. At 510, the communication device initially registers with a broadband wireless network via a broadband interface on the communication device and with a narrowband wireless network via a narrowband interface on the communication device. At 520, one of (i) a first change in status indication is provided from the broadband interface to the narrowband interface reflecting a change in status between the broadband interface and the broadband network, and (ii) a second change in status indication is provided from the narrowband interface to the broadband interface reflecting a change in status between the narrowband interface and the narrowband network. At 530, the communication device transmits one of (i) the first change in status indication and a narrowband status indication to a network component via the narrowband interface, and (ii) the second change in status indication and a broadband status indication to the network component via the broadband interface.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, communication device 102, application processing entity 105 and/or application processing entity 206 of FIGS. 1 and 2 may comprise a set of instructions (perhaps stored in a volatile or non-volatile computer readable medium) that, when executed by a processor, perform some or all of the steps set forth in FIGS. 4 and 5 and corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:

registering a communication device with a broadband wireless network via a broadband interface on the communication device and registering the communication device with a narrowband wireless network via a narrowband interface on the communication device;

providing one of (i) a first change in status indication from the broadband interface to the narrowband interface reflecting a change in status between the broadband interface and the broadband network, and (ii) a second change in status indication from the narrowband interface to the broadband interface reflecting a change in status between the narrowband interface and the narrowband network; and transmitting one of (i) the first change in status indication and a narrowband status indication to a network component via the narrowband interface, and (ii) the second change in status indication and a broadband status indication to the network component via the broadband interface.

2. The method of claim 1, wherein the one of the first change in status indication and second change in status indication is a change in connectivity status and is used by the network component to determine the communication device is currently connected to the respective one of the broadband network and the narrowband network.

3. The method of claim 1, wherein the one of the first and second change in status indication is transmitted via a short message.

4. The method of claim 2, wherein the change in the connectivity status indicates that the communication device has left one of a broadband and narrowband network coverage area or has reentered one of the broadband and narrowband network coverage area.

5. The method of claim 1, wherein, when the first change in status indication is transmitted, the broadband interface is maintained in a sleep mode where the communication device is not using broadband service and, when the second change in status indication is transmitted, the narrowband interface is maintained in a sleep mode where the communication device is not using narrowband service.

6. The method of claim 5, wherein one of:
(i) when the broadband interface is maintained in a sleep mode, the broadband interface is periodically woken up, measures available signal(s) to validate that the communication device is within the broadband network coverage area, and responsive to determining that the communication device is within the broadband network coverage area, the broadband interface returns to the sleep mode; and
(ii) when the narrowband interface is maintained in a sleep mode, the narrowband interface is periodically woken up, measures available signal(s) to validate that the communication device is within the narrowband network coverage area, and responsive to determining that the communication device is within the narrowband network coverage area, the narrowband interface returns to the sleep mode.

7. The method of claim 5, wherein one of:
(i) when the broadband interface is maintained in a sleep mode, the broadband interface is periodically woken up, measures available signal(s) to validate that the communication device is within the broadband network coverage area, responsive to determining that the communication device is not within the broadband network coverage area, the broadband interface sends the first change in status indication to the network component via the narrowband interface, and the broadband interface performs a broadband network search; and
(ii) when the narrowband interface is maintained in a sleep mode, the narrowband interface is periodically woken up, measures available signal(s) to validate that the communication device is within the narrowband network coverage area, responsive to determining that the communication device is not within the narrowband network coverage area, the narrowband interface sends the second change in status indication to the network component via the broadband interface, and the narrowband interface performs a narrowband network search.

8. The method of claim 5, wherein one of:
(i) when the broadband interface is maintained in a sleep mode and broadband service is required, the broadband interface is taken out of the sleep mode to provide a broadband bearer and upon completion of the broadband service, the broadband interface is returned to the sleep mode; and
(ii) when the narrowband interface is maintained in a sleep mode and narrowband service is required, the narrowband interface is taken out of the sleep mode to provide a narrowband bearer and upon completion of the narrowband service, the narrowband interface is returned to the sleep mode.

9. The method of claim 5, wherein one of:
(i) when broadband service is required and when the first change in status indication is sent to the network component via the narrowband interface, the network component sends a page to the communication device via the narrowband network, wherein the communication device receives the page from the narrowband network via the narrowband interface; and
(ii) when narrowband service is required and when the second change in status indication is sent to the network component via the broadband interface, the network component sends a page to the communication device via the broadband network, wherein the communication device receives the page from the broadband network via the broadband interface.

10. The method of claim 9, wherein the communication device responds to the page by communicating with the network component through one of (i) the narrowband interface when the broadband service is required and the broadband interface becomes active and (ii) the broadband interface when the narrowband service is required and the narrowband interface becomes active.

11. The method of claim 10, wherein subsequent to responding to the page, the communication device is configured to (i) send and receive broadband messages on the broadband interface when the broadband interface becomes active and (ii) send and receive narrowband messages on the narrowband interface when the narrowband interface becomes active.

12. A communication device comprising:
a broadband interface configured to register the communication device with a broadband wireless network;
a narrowband interface configured to register communication device with a narrowband wireless network; and
a processor configured to:
register the communication device with a broadband wireless network via the broadband interface and register the communication device with a narrowband wireless network via the narrowband interface;
provide one of (i) a first change in status indication from the broadband interface to the narrowband interface reflecting a change in status between the broadband interface and the broadband network, and (ii) a second change in status indication from the narrowband interface to the broadband interface reflecting a change in status between the narrowband interface and the narrowband network; and
transmit one of (i) the first change in status indication and a narrowband status indication to a network component via the narrowband interface, and (ii) the second change in status indication and a broadband status indication to the network component via the broadband interface.

13. The communication device of claim 12, wherein the one of the first change in status indication and second change in status indication is a change in connectivity status and is used by the network component to determine whether the communication device is currently connected to the respective one of the broadband network and the narrowband network.

14. The communication device of claim 12, wherein the one of the first and second change in status indication is transmitted via a short message.

15. The communication device of claim 12, wherein the change in the connectivity status indicates that the communication device has left one of a broadband and narrowband network coverage area or has reentered one of the broadband and narrowband network coverage area.

16. The communication device of claim 12, wherein when the first change in status indication is transmitted, the processor is further configured to maintain the broadband interface in a sleep mode when the communication device is not using broadband service and, when the second change in status indication is transmitted, maintain the narrowband interface in a sleep mode when the communication device is not using narrowband service.

17. The communication device of claim 16, wherein one of
 (i) when the broadband interface is maintained in a sleep mode, processor is further configured to periodically wake up the broadband interface, measures available signal(s) via the broadband interface to validate that the communication device is within the broadband network coverage area, and responsive to determining that the communication device is within the broadband network coverage area, cause the broadband interface to return to the sleep mode; and
 (ii) when the narrowband interface is maintained in a sleep mode, the processor is further configured to periodically wake up the narrowband interface, measure available signal(s) via the narrowband interface to validate that the communication device is within the narrowband network coverage area, and responsive to determining that the communication device is within the narrowband network coverage area, cause the narrowband interface to return to the sleep mode.

18. The communication device of claim 16, wherein one of:
 (i) when the broadband interface is maintained in a sleep mode, the processor is further configured to periodically wake up the broadband interface, measures available signal(s) via the broadband interface to validate that the communication device is within the broadband network coverage area, responsive to determining that the communication device is not within the broadband network coverage area, cause the broadband interface to send the first change in status indication to the network component via the narrowband interface, and cause the broadband interface to perform a broadband network search; and
 (ii) when the narrowband interface is maintained in a sleep mode, the processor is further configured to periodically wake up the narrowband interface, measures available signal(s) to validate that the communication device is within the narrowband network coverage area, responsive to determining that the communication device is not within the narrowband network coverage area, cause the narrowband interface to send the second change in status indication to the network component via the broadband interface, and cause the narrowband interface to perform a narrowband network search.

19. The communication device of claim 16, wherein one of:
 (i) when the broadband interface is maintained in a sleep mode and broadband service is required, the processor is further configured to cause the broadband interface to be taken out of the sleep mode to provide a broadband bearer and upon completion of the broadband service, cause the broadband interface to return to the sleep mode; and
 (ii) when the narrowband interface is maintained in a sleep mode and narrowband service is required, the processor is further configured to cause the narrowband interface to be taken out of the sleep mode to provide a narrowband bearer and upon completion of the narrowband service, cause the narrowband interface to return to the sleep mode.

20. The communication device of claim 16, wherein one of:
 (i) when broadband service is required and when the first change in status indication is sent to the network component via the narrowband interface, the network component sends a page to the communication device via the narrowband network, wherein the communication device receives the page from the narrowband network via the narrowband interface; and
 (ii) when narrowband service is required and when the second change in status indication is sent to the network component via the broadband interface, the network component sends a page to the communication device via the broadband network, wherein the communication device receives the page from the broadband network via the broadband interface.

21. The communication device of claim 20, wherein the processor is further configured to respond to the page by communicating with the network component through one of (i) the narrowband interface when the broadband service is required and the broadband interface becomes active and (ii) the broadband interface when the narrowband service is required and the narrowband interface becomes active,
 wherein upon responding to the page, the processor is further configured to (i) send and receive broadband messages on the broadband interface when the broadband interface becomes active and (ii) send and receive narrowband messages on the narrowband interface when the narrowband interface becomes active.

\* \* \* \* \*